July 31, 1951
C. F. CARTER ET AL
2,562,659
PEANUT HARVESTING MACHINE
Filed Nov. 28, 1947
2 Sheets-Sheet 1
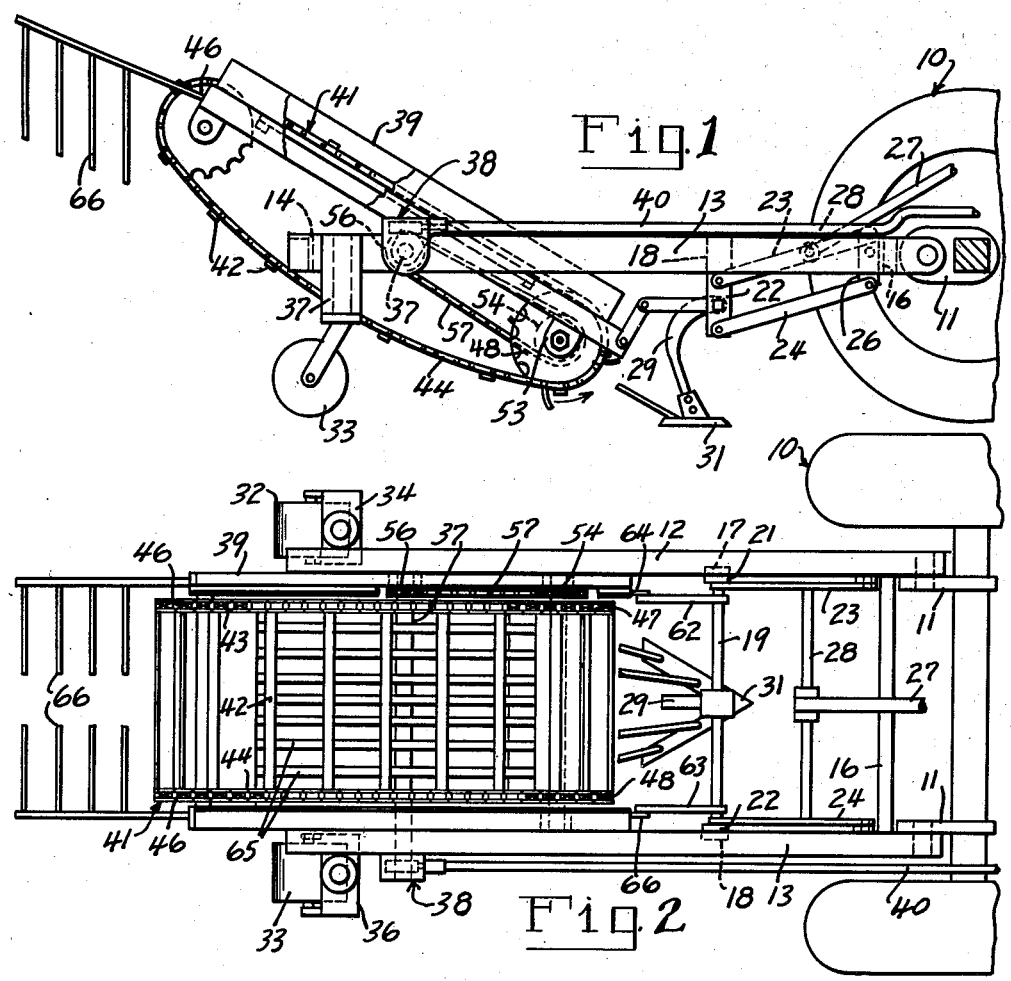
INVENTORS
Charlie F. Carter
William W. Carter
BY
Attorney July 31, 1951 C. F. CARTER ET AL 2,562,659
PEANUT HARVESTING MACHINE
Filed Nov. 28, 1947 2 Sheets-Sheet 2
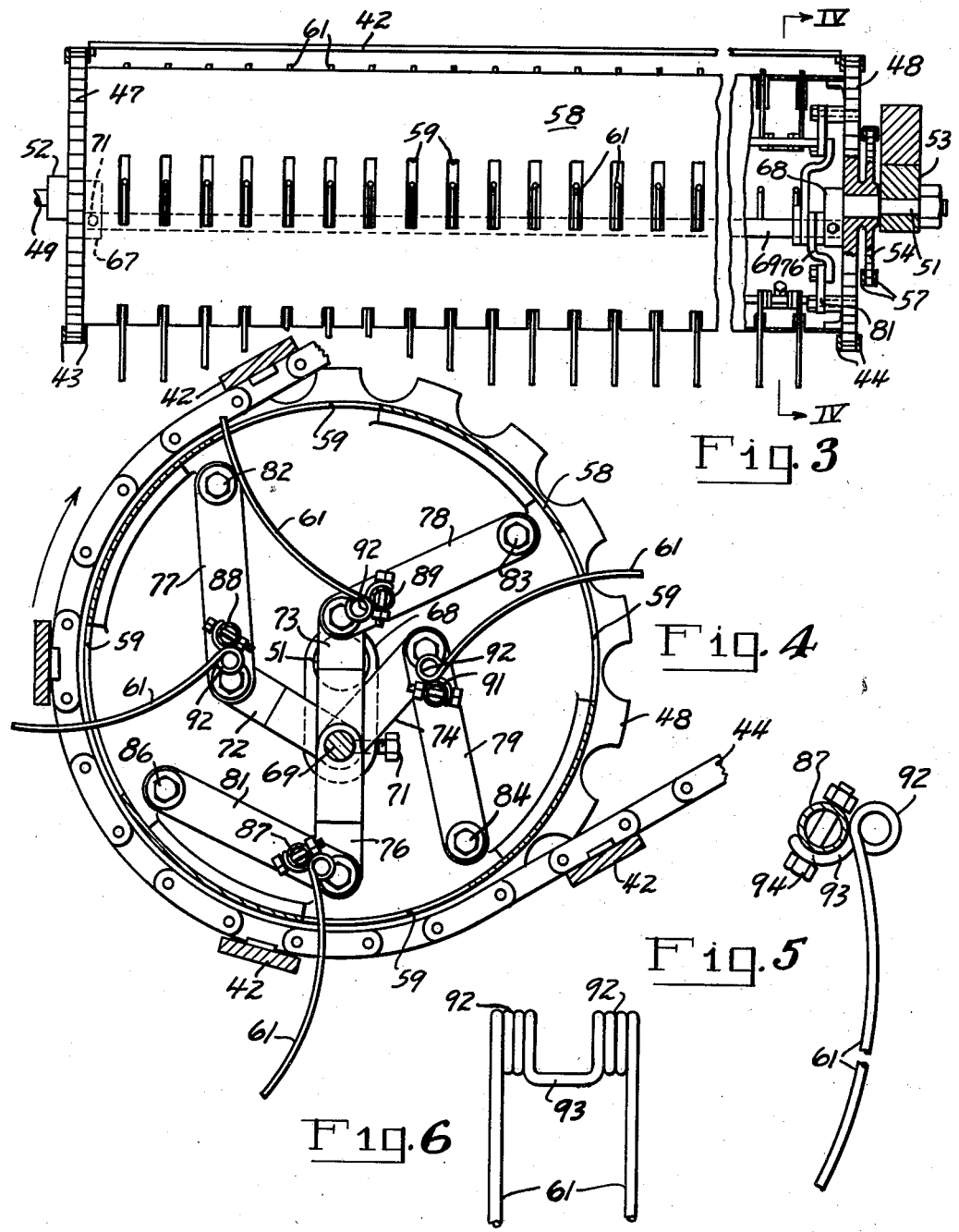
INVENTORS
Charlie F. Carter
BY William W. Carter
Henry L. Jennings
Attorney Patented July 31, 1951

2,562,659

UNITED STATES PATENT OFFICE 2,562,659

PEANUT HARVESTING MACHINE

Charlie F. Carter and William W. Carter,
Brundige, Ala.

Application November 28, 1947, Serial No. 788,454

4 Claims. (Cl. 55—9)

Our invention relates to machines for harvesting peanuts on the vine and has for an object the provision of apparatus of the character designated which shall include improved means for picking the vines up off the ground, shaking the dirt loose from the roots and nuts and placing the vines in windrows.

A further object of our invention is to provide a machine for harvesting peanuts which shall include a rotating drum movable over a row of peanuts, and having a plurality of lifting arms mounted therein, together with means within the drum for extending the lifting arms as they move downwardly to engage the vines and retract them as they lift the vines above the drum and deliver them onto a conveyor.

A still further object of our invention is to provide a tractor-drawn peanut harvesting machine which shall include improved means for manipulating the machine whereby it may be turned and operated in close places such as in corners and at the ends of rows.

Briefly, our invention comprises a tractor-drawn conveyor apparatus supported at its forward end by a pivotal connection with the tractor frame and at its rear end by swiveled supporting wheels whereby it may be turned short with the tractor and moved into close places. The forward lower end of the conveyor comprises a rotating drum, driven from the power take off of the tractor in a direction such that its lower surface is moving in the same direction that the apparatus is being moved over the ground. Included in the drum are a multiplicity of lifting tines mounted on a rotating reel within the drum and rotating eccentrically with respect to the drum whereby the tines are projected outwardly of the drum as they move downwardly towards the earth, and are withdrawn from the surface of the drum as they move upwardly. They thus pick up the loosened vines and deliver them onto a slatted conveyor which serves to shake the dirt loose from the vines and nuts and delivers the vines in a windrow at the rear of the machine.

Apparatus embodying features of our invention is illustrated in the accompanying drawings forming a part of this application in which:

Fig. 1 is a side elevation;

Fig. 2 is a plan view;

Fig. 3 is a sectional plan view of the drum;

Fig. 4 is a sectional view taken along the line IV—IV of Fig. 3;

Fig. 5 is a sectional view showing the mounting of the lifting tines; and

Fig. 6 is an elevational view of a lifting tine.

Referring to the drawings for a better understanding of our invention, we show at 10 a fragment of a tractor having frame members 11 extending rearwardly therefrom. Pivotally connected to the members 11 are the side frame members 12 and 13 of our improved harvesting machine. The side frame members 12 and 13 are connected by cross frame members 14 and 16 to provide a rigid construction. Extending downwardly from the members 12 and 13 are brackets 17 and 18 in which is mounted a lift shaft 19. Rocker arms 21 and 22 are connected at the ends of the shaft and have connected thereto upper and lower links 23 and 24. The links 23 and 24 are connected at their forward ends to rocker arms 26, only one of which is shown. A pull rod 27 is connected to the upper links 23 by means of a cross rod 28, whereby the shaft 19 may be oscillated. Mounted on the shaft 19 intermediate its ends is a plow stock 29 having a plow 31 mounted thereon which is adapted to be drawn along the row of peanuts to loosen them in the earth. The plow may be raised and lowered by rocking the shaft 19 by means of the pull rod 27, the links 23 and 24, and the rocker arms 21 and 22.

The harvesting apparatus is supported at the rear by means of swiveled supporting wheels 32 and 33 mounted in brackets 34 and 36 secured to the side frame members 12 and 13. Extending across the side frame members towards the rear, is a cross shaft 37. The shaft 37 is rotated by means of a worm gear drive 38 and a flexible shaft 40 leading from the power take off of the tractor 10, not shown.

Pivotally supported from the shaft 37 is the frame 39 of a conveyor 41. The conveyor 41 comprises a plurality of transverse slats 42 carried by chains 43 and 44 which pass over sprockets 46 at the upper, rear end thereof and over sprockets 47 and 48 at the lower, forward end thereof. The sprockets 47 and 48 are mounted to rotate on stub shafts 49 and 51 secured in brackets 52 and 53 mounted on the conveyor frame 39. Joined to the sprocket 48 is a smaller sprocket 54. Mounted on the cross shaft 37 is a driving sprocket 56 which connects with the sprocket 54 by means of a chain 57. The sprockets 47 and 48 are connected by means of a sheet metal cover 58 forming a drum over which the conveyor slats 42 pass. The cover 58 is provided with a multiplicity of slots 59 through which lifting tines 61 protrude to raise the peanut vines from the ground and elevate them on the conveyor in a manner to be described later. The forward end of the conveyor frame 39 is connected to the lifting shaft 19 by means of arms 62 and 63 mounted on the shaft 19 and links 64 and 66 connected to the forward ends of the conveyor frame. The conveyor slats 42 in their upward and rearward movement pass over a slatted bottom 65 which permits the dirt to fall through. At the rear, the conveyor delivers the peanut vines into a downwardly sloping, slatted hopper 66 which causes the vines to fall into windrows behind the apparatus.

Extending downwardly from the inner ends of the stub shafts 49 and 51 are brackets 67 and 68 in which is mounted a fixed shaft 69, the same being secured therein by means of set screws 71. Mounted on the shaft 69, at each end thereof, (only one being shown) are a plurality of relatively short links 72, 73, 74, and 76. Connected to the opposite ends of the short links are an equal number of relatively long links 77, 78, 79, and 81. The outer ends of the longer links 77, 78, 79, and 81 are pivotally connected to their associated sprockets, near the periphery thereof, at 82, 83, 84 and 86. Connecting the opposed longer links 77, 78, 79 and 81 at points near their connections with the shorter links 72, 73, 74 and 76 are rods 87, 88, 89 and 91 which extend from end to end of the drum. Mounted on each of the rods 87, 88, 89 and 91 are a plurality of the spring lifting tines 61, heretofore mentioned. Each of the lifting tines, as shown in Figs. 5 and 6, is made of spring wire in a U-shape so that two prongs extend out through the associated slots 59 in the drum. At the inner ends of the tines, they are provided with a plurality of turns 92 to provide the requisite resiliency and with a small U-bend 93 for receiving a securing bolt 94 which extends through the associated rod or tube. The tines may thus be readily replaced in case of breakage. The operation of our improved apparatus is as follows:

The apparatus is drawn along a row of peanuts with the plow 31 lowered to pass under the row beneath the roots and raise the roots out of the ground. The shaft 37 is driven in a direction to rotate the sprockets 47 and 48 in a direction so that the under surface of the drum 58 is moving in the same direction that the apparatus is moving over the ground. As the sprockets 47 and 48 rotate, they rotate the links 72, 73, 74, and 76 around the eccentrically mounted shaft 69 so that the outer ends of the links are at their nearest distance from the earth when in their lowest position. This causes the tines 61 to protrude their maximum distance through the surface 58 of the drum when directly over the ground and their minimum distance when they are rotated to their uppermost position, as shown in Fig. 4 of the drawing. The vines are thus picked up off the ground and raised by the tines 61 to the upper surface of the drum whereupon the tines are withdrawn and the slats 42 of the conveyor engage them and carry them upwardly and rearwardly over the slatted bottom 65 of the conveyor to shake the dirt loose from the vines and then deliver them at the rear through the inclined slats 66 to form windrows.

From the foregoing it will be apparent that we have devised an improved peanut harvesting machine which is sturdy and simple of design, and reliable in operation, and one whereby peanuts may be readily and economically removed from the ground, cleaned and placed in windrows for ready stacking.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a machine for harvesting peanuts on the vine, including a tractor drawn plow mounted to move along a row of peanuts and loosen the vines, a drum mounted transversely of the row at the rear of the plow, and means to rotate the drum for its under surface to move in the same direction as the plow; the improvement which comprises stub shafts at each end of the drum upon which it is mounted for rotation, a second shaft in the drum mounted eccentrically below the stub shafts and secured against rotation with the drum, a plurality of relatively short links at each end of the drum pivotally connected at one end to the eccentrically mounted shaft, a like number of longer links connected each at one end to one of the shorter links and at the other end to the drum near the periphery thereof, a plurality of rods extending longitudinally of the drum and connecting opposed longer links near their points of connection to the shorter links, and a plurality of tines mounted on each rod and extending out through the drum, there being slots in the drum to receive the tines.

2. In apparatus for harvesting peanuts, a rotary drum, a fixed shaft mounted within the drum and extending longitudinally thereof eccentrically of and below the axis of rotation of the drum, a plurality of links mounted to rotate about said fixed shaft in unison with the rotation of the drum, a second link connected at one end to the outer end of each of said first mentioned links and at its other end to the end of the drum near its periphery, and lifting tines operatively connected with the links near their hinge points and extending through the drum, there being slots in the drum to receive the tines.

3. In apparatus for harvesting peanuts, a rotary drum, a fixed shaft mounted within the drum and extending longitudinally thereof eccentrically of and below the axis of rotation of the drum, a plurality of links mounted at each end of the drum to rotate about said fixed shaft in unison with the rotation of the drum, a second link hingedly connected at one end to the outer end of each of said first mentioned links and at its other end to the end of the drum near its periphery, a plurality of rods connecting opposed links near their hinge points and extending axially of the drum, and lifting tines mounted on the rods and extending outwardly through the drum, there being slots in the drum surface through which the tines protrude.

4. Apparatus as defined in claim 3 in which the links connected to the fixed shaft are shorter than the links connected to the ends of the drum and to the shorter links and in which the rods connect the opposed longer links near their hinge points with the shorter links.

CHARLIE F. CARTER.
WILLIAM W. CARTER.

REFERENCES CITED

The following references are of record in the file of this patent:

UNITED STATES PATENTS

| Number | Name | Date |
|---|---|---|
| 2,141,493 | Tallman | Dec. 27, 1938 |
| 2,297,065 | McLendon | Sept. 29, 1942 |
| 2,388,212 | McElhoe et al. | Oct. 30, 1945 |
| 2,417,905 | Blaydes | Mar. 25, 1947 |